US008774232B2

(12) United States Patent
Smith et al.

(10) Patent No.: US 8,774,232 B2
(45) Date of Patent: Jul. 8, 2014

(54) SYSTEMS AND METHODS OF MEASURING LATENCY AND ROUTING THEREON IN OPTICAL NETWORKS

(75) Inventors: Alexander A. Smith, Marietta, GA (US); Vagish Madrahalli, Woodstock, GA (US); Richard W. Conklin, Gainesville, GA (US)

(73) Assignee: Ciena Corporation, Linthicum, MD (US)

( * ) Notice: Subject to any disclaimer, the term of this patent is extended or adjusted under 35 U.S.C. 154(b) by 757 days.

(21) Appl. No.: 12/903,277

(22) Filed: Oct. 13, 2010

(65) Prior Publication Data

US 2011/0170860 A1 Jul. 14, 2011

Related U.S. Application Data

(63) Continuation-in-part of application No. 12/684,457, filed on Jan. 8, 2010, now Pat. No. 8,306,420.

(51) Int. Cl.
*H04J 3/06* (2006.01)
(52) U.S. Cl.
USPC .............................................. 370/519; 398/53
(58) Field of Classification Search
None
See application file for complete search history.

(56) References Cited

U.S. PATENT DOCUMENTS

| 7,418,639 | B2 | | 8/2008 | Natarajan | |
|---|---|---|---|---|---|
| 7,496,295 | B2 | * | 2/2009 | Baldine et al. | 398/69 |
| 7,889,723 | B2 | * | 2/2011 | Beshai et al. | 370/355 |
| 2001/0055136 | A1 | * | 12/2001 | Horiuchi et al. | 359/135 |
| 2004/0114539 | A1 | * | 6/2004 | Beshai et al. | 370/254 |
| 2007/0097865 | A1 | * | 5/2007 | Song et al. | 370/235 |
| 2008/0240077 | A1 | * | 10/2008 | Freiberger | 370/351 |
| 2009/0046586 | A1 | * | 2/2009 | Stuart et al. | 370/236 |
| 2009/0067338 | A1 | | 3/2009 | Pan | |
| 2009/0122813 | A1 | * | 5/2009 | Zhang | 370/503 |
| 2009/0162052 | A1 | * | 6/2009 | Xia et al. | 398/25 |
| 2009/0196282 | A1 | * | 8/2009 | Fellman et al. | 370/352 |
| 2010/0054739 | A1 | * | 3/2010 | Lavillonniere et al. | 398/67 |
| 2010/0128606 | A1 | * | 5/2010 | Patel et al. | 370/235 |
| 2011/0076031 | A1 | * | 3/2011 | Surek et al. | 398/161 |
| 2011/0141922 | A1 | * | 6/2011 | Kotrla et al. | 370/252 |
| 2011/0211827 | A1 | * | 9/2011 | Soto et al. | 398/25 |

* cited by examiner

*Primary Examiner* — Phirin Sam
(74) *Attorney, Agent, or Firm* — Clements Bernard PLLC; Christopher L. Bernard; Lawrence A. Baratta, Jr.

(57) ABSTRACT

The present disclosure provides systems and methods for making latency measurements and using these measurements in routing in optical networks. In an exemplary embodiment, a method is defined whereby two nodes sharing a line automatically determine whether both nodes are capable of making a latency measurement and then which node will initiate and which node participates in making the latency measurement. In another exemplary embodiment, an on-demand latency measurement may be made between any two arbitrary nodes within a domain. Routing messages may be used to disseminate the latency of links via a signaling and routing protocol. Advantageously, the present invention provides measurement of latency and latency variation of customer circuits (i.e., SNCs) using an in-band, non-intrusive calculation with a high-degree of accuracy. Furthermore, the present invention may consider these calculations for circuit routing based on the latency and circuit acceptance based on maximum latency restrictions.

17 Claims, 14 Drawing Sheets

SYSTEMS AND METHODS OF MEASURING LATENCY AND ROUTING THEREON IN OPTICAL NETWORKS

CROSS-REFERENCE TO RELATED APPLICATION(S)

This application is a continuation-in-part of commonly assigned and U.S. patent application Ser. No. 12/684,457 filed Jan. 8, 2010, now U.S. Pat. No. 8,306,420, and entitled "OPTICAL NETWORK REAL TIME LATENCY MEASUREMENT SYSTEMS AND METHODS," the contents of which are incorporated in full by reference herein.

FIELD OF THE INVENTION

The present invention relates generally to optical networking. More particularly, the present invention relates to systems and methods for measuring latency and routing connections in an optical network based upon the measured latency among other criteria.

BACKGROUND OF THE INVENTION

Optical networks are being deployed in interconnected mesh configurations using signaling and routing between network elements for establishing and maintaining sub network connections (SNCs). Conventionally, in optical networks, delay (i.e., latency) is measured indirectly via, administrative weights ("admin weights"), manually determined such as based on distance calculations, or to some extent derived using signaling message delays. There exists no known systems or methods to measure delay of lines (e.g., SNCs) in a non-intrusive and accurate manner. So, actual delay that is seen across hops (i.e., links in the network) is never measured and is not propagated to a routing database so that SNCs may be routed based on latency. There is no known method for two nodes or network elements that share a line to automatically establish who will make a measurement between them and who will participate and then have those measurements disseminated throughout the domain, so it may be used to route SNCs based on latency. Importantly, there is no on-demand delay discovery method for measuring the latency between two arbitrary end points in a domain in the network.

BRIEF SUMMARY OF THE INVENTION

In an exemplary embodiment, an optical network includes a plurality of optical nodes; and a plurality of links interconnecting the plurality of optical nodes; wherein a first node of the plurality of optical nodes is configured to initiate a latency measurement to a second node of the plurality of optical nodes via transmitting an indicator, the second node configured to receive and loop-back the indicator to the first node, and the first node configured to calculate latency to the second node based upon reception of the loop-backed indicator. The indicator may include transitioning one or more bits in overhead. Optionally, the overhead includes Synchronous Optical Network or Synchronous Digital Hierarchy. Alternatively, the overhead includes Optical Transport Network. The first node is configured to perform a plurality of latency measurements to the second node and computing an average of the plurality of latency measurements. If the plurality of latency measurements differs by more than one frame, then the first node indicates inability to obtain a stable latency measurement. The first node is configured to calculate latency by adding latencies associated with each of the plurality of links between the first node and the second node plus a predetermined latency time for each pass-through node. The optical network may further include a management system communicatively coupled to the plurality of nodes; wherein the management system is configured to execute an on-demand latency measurement between any arbitrary points of the plurality of nodes with the first node and the second node selected through the management system. The on-demand latency measurement may include determining a designated transit list between the first node and the second node; and utilizing an active sub network connection on the designated transit list for the indicator to measure latency at the first node. The on-demand latency measurement may further include, if there is no active sub network connection on the designated transit list, creating an on-demand sub network connection to measure latency at the first node; and deleting the on-demand sub network connection following measurement. The optical network may further include a controller disposed at the first node and the second node, wherein the controller is configured to operate a signaling and routing protocol to provision sub network connections between the first node and the second node; wherein the controller is configured to transmit and receive measured or manually entered latencies associated with the plurality of links via messages in the signaling and routing protocol; and wherein the controller is configured to utilize the latencies in route selection of the sub network connections. Optionally, the controller is configured to route the sub network connections between the first node and the second node to ensure that the total latency from the first node to the second node is less than the maximum latency specified for the sub network connection.

In another exemplary embodiment, a method includes operating an optical network including a plurality of nodes and a signaling and routing protocol; utilizing a latency measurement algorithm to measure latency on a plurality of links interconnecting the plurality of nodes; distributing measured latency values on the plurality of links via messages in the signaling and routing protocol; storing the measured latency values in a database; and utilizing the measured latency values in the signaling and routing protocol for route selection. The latency measurement algorithm may include determining a master node and a slave node of the plurality of nodes, wherein the master node and the slave node are adjacent to one another connected by a link of the plurality of links; transmitting an indicator from the master node to the slave node; looping back the indicator at the slave node to the master node; receiving the looped back indicator at the master node and computing a latency value; and repeating the transmitting, looping back, and receiving steps a plurality of times to provide an averaged latency measurement as the measured latency value of the link. Optionally, the master node and the slave node are determined based upon node identification values. The method may further include requesting a sub network connection between two nodes of the plurality of nodes; requesting a maximum latency value for the sub network connection; and determining a designated transit list based on the maximum latency value and the measured latency values.

In yet another exemplary embodiment, a latency measurement method, includes operating a plurality of optical nodes in a domain, wherein the plurality of optical nodes are communicatively coupled to a management system; selecting two arbitrary nodes defined as an initiator node and a terminator node of the plurality of optical nodes for computing latency therebetween; selecting a designated transit list between the two arbitrary nodes; transmitting an indicator in an active sub network connection using the designated transit list to the terminator node from the initiator node; looping back the indicator at the terminator node to the initiator node; and receiving the indicator at the indicator node and computing latency based upon a time interval from transmitting the indicator until the receiving the indicator divided by two. The latency measurement method may further include, if no active sub network connection exists using the designated transit list, creating an on-demand sub network connection using the designated transit list thereby providing the active sub network connection; and deleting the on-demand sub network connection upon completion. The latency measurement method may further include locking the active sub network connection prior to the transmitting step thereby preventing mesh restoration; and unlocking the active sub network connection upon completion.

BRIEF DESCRIPTION OF THE DRAWINGS

The present invention is illustrated and described herein with reference to the various drawings of exemplary embodiments, in which like reference numbers denote like method steps and/or system components, respectively, and in which.

DETAILED DESCRIPTION OF THE INVENTION

In various exemplary embodiments, the present invention provides systems and methods for making latency measurements and using these measurements in routing in optical networks. Latency is a measurement of time delay experienced in a system, such as an optical network including wavelength division multiplexers (WDM), optical switches, data routers and switches, and the like. In optically switched networks, latency may be critical to enterprise end-customers providing time critical applications, to storage providers with tight service level agreements, and the like. In an exemplary embodiment, a method is defined whereby two nodes sharing a line automatically determine whether both nodes are capable of making a latency measurement and then which node will initiate and which node participates in making the latency measurement. When measurements are possible between two nodes, an averaged value of multiple measurements may be made and used as a trusted value. When measurements are not possible, an entered value may be placed by a user. Measured or entered, routing messages are used to disseminate the latency of links via a signaling and routing protocol. Once all nodes in the domain have synchronized databases, connections in the optical network (e.g., SNCs) may be routed considering latency as one of a plurality of criteria. Advantageously, the present invention provides measurement of latency and latency variation of customer circuits (i.e., SNCs) using an in-band, non-intrusive calculation with a high-degree of accuracy. Furthermore, the present invention may consider these calculations for circuit routing based on the latency and circuit acceptance based on maximum latency restrictions.

In an exemplary embodiment, the present invention contemplates use with Optical Transport Network (OTN), Synchronous Optical Network (SONET), Synchronous Digital Hierarchy (SDH), and the like. Those of ordinary skill in the art will recognize the present invention may be used with other protocols. ITU-T defines OTN as a set of Optical Network Elements connected by optical fiber links, able to provide functionality of transport, multiplexing, routing, management, supervision and survivability of optical channels carrying client signals. Of note, OTN is defined in: ITU-T G.709 "Interfaces for the optical transport network (OTN)"; ITU-T G.798 "Characteristics of optical transport network hierarchy equipment functional blocks"; and the like. The latency measurements and routing thereon are compliant with OTN protocols such as ITU-T G.709. In an exemplary embodiment, the present invention may provides delay measurements via overhead bytes, such as, for example, via Tandem Connection Monitoring (TCM) overhead bytes in OTN, Z line overhead bytes, in SONET, and the like. Through the overhead, nodes sharing a line may determine who can and will make latency measurements.

Figure 1:
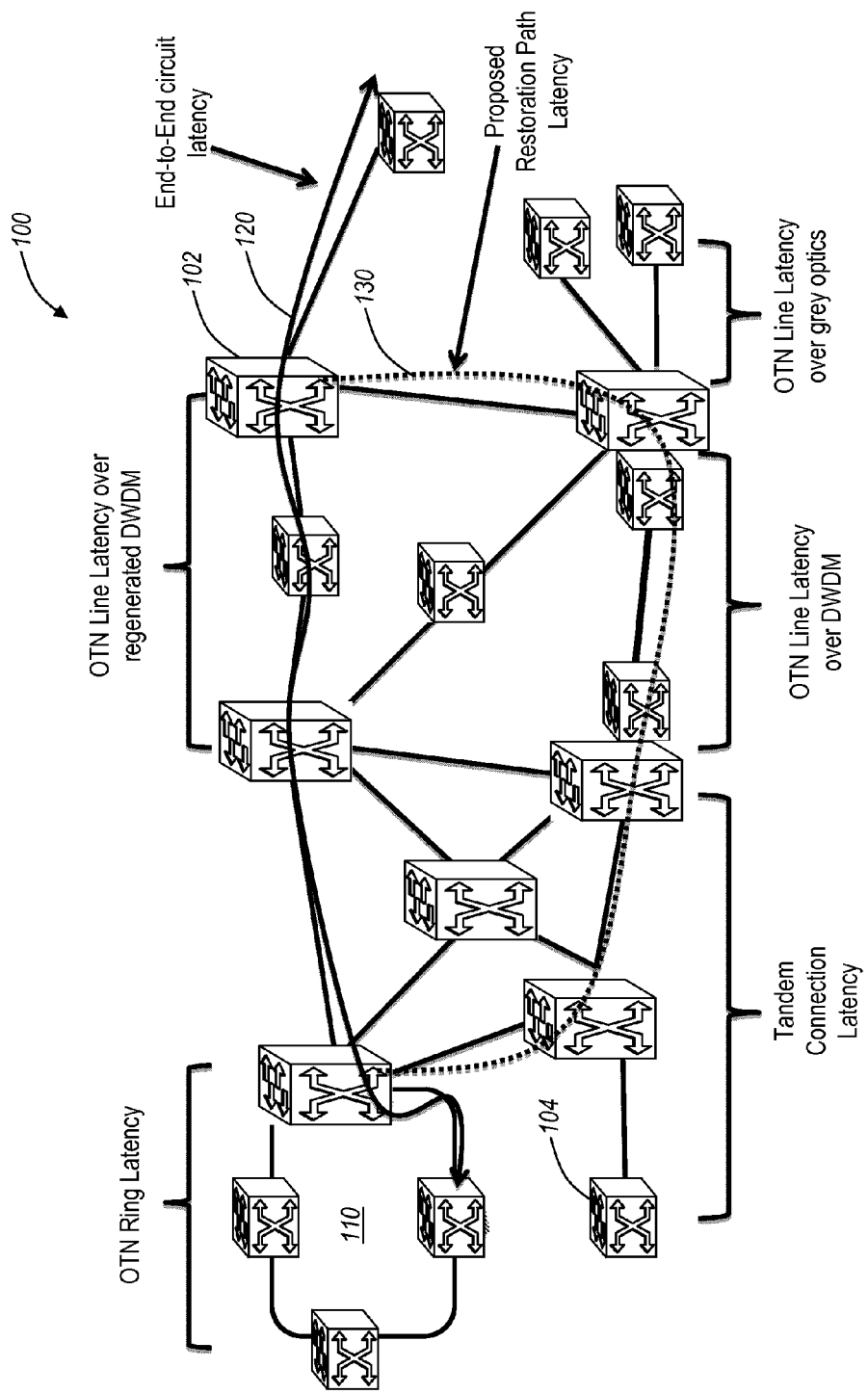
FIG. 1 is a network diagram of an optical network illustrating latency applications amongst a plurality of interconnect nodes.

Referring to FIG. 1, in an exemplary embodiment, an optical network 100 illustrates latency applications amongst a plurality of interconnect nodes 102, 104. Specifically, the nodes 102 may include optical switches in an interconnect mesh topology, and the nodes 104 may include WDM multiplexers, multi-service provisioning platforms (MSPPs), add/drop multiplexers (ADMs), data switches/routers, and the like as spurs off of the optical switches. An optical switch is a network element (NE) that may consolidate the functionality of a multi-service provisioning platform (MSPP), digital cross connect (DCS), Ethernet and Optical Transport Network (OTN) switch, dense wave division multiplexed (DWDM) platform, etc. into a single, high-capacity intelligent switching system providing layer zero, one, and two consolidation. The nodes 104 are adjunct to the nodes 102 and may be viewed as end-user, client devices, for example. In particular, the nodes 104 may provide access, aggregation, and the like of end-user services.

Generally, the optical switch includes common equipment, line modules, and switch modules. Those of ordinary skill in the art will recognize this is one exemplary embodiment of an optical switch and the present invention contemplates use with other embodiments as well. The common equipment may include power, a control module, operations, administration, maintenance, and provisioning (OAM&P) access, and the like. For example, the common equipment may connect to a network management system (NMS). Additionally, the common equipment may include a processor or controller configured to operate a control plane and the systems and methods described herein. In general, the line modules are communicatively coupled to the switch modules and provide ingress and egress to/from the optical switch. The line modules may include optical transceivers, such as, for example, 2.5 Gb/s (OC-48/STM-1, OTU1, ODU1), 10 Gb/s (OC-192/STM-64, OTU2, ODU2), 40 Gb/s (OC-768/STM-256, OTU3, ODU4), etc. Further, the line modules may include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s. In an exemplary embodiment, the line modules may form ingress and egress switches with the switch modules as center stage switches for a three-stage switch, e.g. three stage Clos switch. The switch modules are configured to switch services between the line modules. For example, the switch modules 106 may provide wavelength granularity, SONET/SDH granularity such as Synchronous Transport Signal-1 (STS-1), Synchronous Transport Module level 1 (STM-1), Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical channel Payload Virtual Containers (OPVCs), etc.; Ethernet granularity; and the like.

The nodes 102 are interconnected in a mesh topology and may operate a control plane. For example, the control plane can include Optical Signaling and Routing Protocol (OSRP), Automatically Switched Optical Networks—ITU-T Recommendation G.8080: Architecture for the Automatically Switched Optical Network (ASON) 2001, Generalized Multi-Protocol Label Switching Architecture (G-MPLS) IETF RFC 3945, 2004, and the like. OSRP is a distributed protocol designed for controlling a network of optical switches or cross-connects (OXCs). OSRP introduces intelligence in the control plane of an optical transport system. It may perform many functions such as automatic resource discovery, distributing network resource information, establishing and restoring connections dynamically across the network, and the like. ASON allows for dynamic policy-driven control of an optical SONET/SDH network based on signaling between a user and components of the network. Its aim is to automate the resource and connection management within the network. The IETF defines ASON as an alternative/supplement to NMS based connection management. In particular, ASON provides fast and automatic end-to-end provisioning; fast and efficient re-routing; support of different clients; dynamic set up of connections; support of Optical Virtual Private Networks (OVPNs); support of different levels of quality of service; and the like. G-MPLS dynamically provisions resources and provides network survivability using protection and restoration techniques. Those skilled in the art will recognize that other intelligent signaling and routing protocols that can (or can be modified to) provide similar functionality as OSRP, ASON, G-MPLS (e.g., automatically establishing and restoring connections across the network, and the like) are within the scope of embodiments of the invention.

FIG. 1 illustrates exemplary sources of latency in the optical network 100. In an exemplary embodiment, the nodes 102, 104 operate using OTN. There are various points, sources, etc. of latency in the optical network. For example, there is Optical Channel Transmission Unit (OTU) ring latency associated with the nodes 102, 104 in an optical ring 110. There is latency between a connection from the node 104 to the node 102, i.e. OTN line latency over grey optics. There may be OTU line latency over DWDM and over regenerated DWDM between the nodes 102. Further, there may be Tandem Connection latency from a node 104 through various nodes 102. An end-to-end SNC circuit 120 may have a certain latency value whereas a proposed restoration path 130 for the SNC circuit 120 may have a different latency value. The present invention provides systems and methods for measuring latency between arbitrary nodes 102, 104, choosing paths based upon latency values, choosing restoration paths based upon latency values, and the like. In an exemplary embodiment, the various nodes 102, 104 include circuitry, firmware, software, etc. configured to perform latency measurements. For example, the nodes 102, 104 may include field programmable gate arrays (FPGAs) that perform latency calculations. An FPGA can be either fabric facing or line (fiber) facing. Line facing is typically done at the OSRP line layer (to get the latency value for a specific link). Fabric facing is typically done at the drop side by the originating (called initiating in this application) and looped back at the terminating node to get the total end-to-end latency including the fabric (intra-node) latency. Furthermore, the present invention may perform multiple latency calculations simultaneously including line-side and fabric-side calculations and multiple line-side as well.

Figure 2:
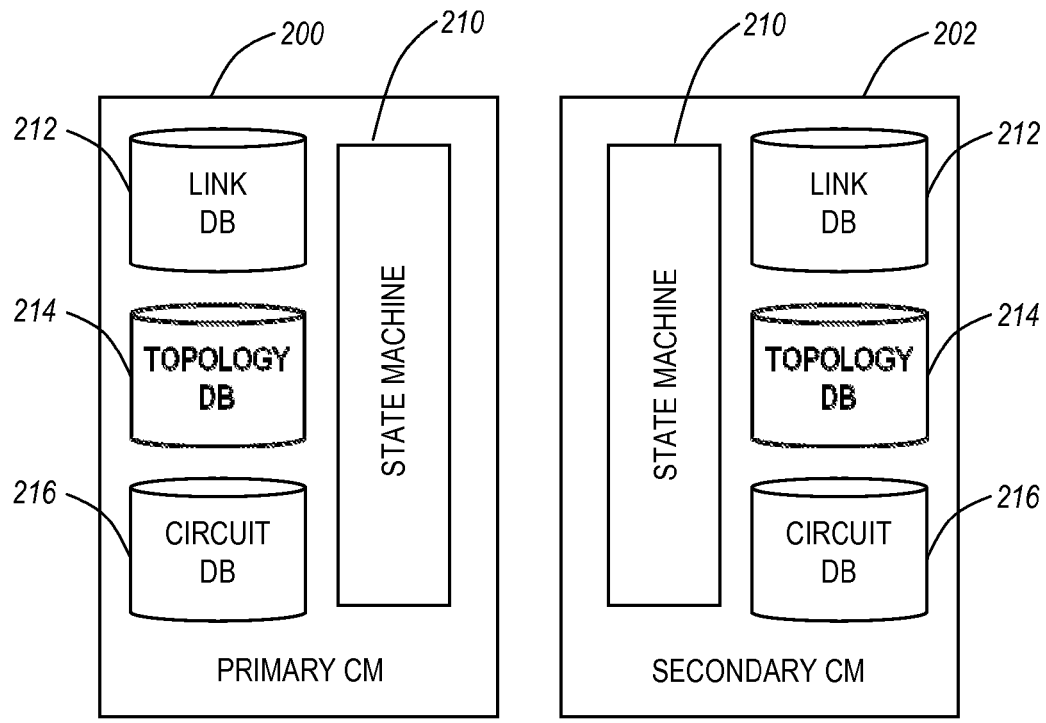
FIG. 2 is a block diagram of redundant control modules (CMs) configured to provide control of a network element or node.

Referring to FIG. 2, in an exemplary embodiment, redundant control modules (CMs) 200, 202 are illustrated to provide configuration and control of a network element or node. The CMs 200, 202 may be part of common equipment of the nodes 102, 104 in FIG. 1. In general, the CMs 200, 202 are configured to provide operations, administration, maintenance, and provisioning (OAM&P) functions associated with a network element, node, network, etc. In an exemplary embodiment, the CMs 200, 202 may be further configured to provide control plane processing, such as OSRP, ASON, G-MPLS, etc. In the present invention, the CMs 200, 202 are configured to provide latency measurements over line interfaces, to exchange latency measurements for particular lines with other CMs 200, 202, and to optionally route circuits based at least in part of the latency measurements. The CMs 200, 202 may include a processor which is generally a hardware device for executing software instructions. The processor may be any custom made or commercially available processor, a central processing unit (CPU), an auxiliary processor among several processors associated with the CMs 200, 202, a semiconductor-based microprocessor (in the form of a microchip or chip set), or generally any device for executing software instructions. When the CM 200, 202 is in operation, the processor is configured to execute software stored within memory, to communicate data to and from the memory, and to generally control operations of the CM 200, 202 pursuant to the software instructions.

The CMs 200, 202 may also include network interfaces, a data store, memory, and the like. The network interfaces may be used to enable the CMs 200, 202 to communicate on a network, such as to communicate control plane information to other CMs, OAM&P information, etc. The network interfaces may include, for example, an Ethernet card (e.g., 10 BaseT, Fast Ethernet, Gigabit Ethernet), a wireless local area network (WLAN) card (e.g., 802.11a/b/g/n), or the like. The network interfaces may include address, control, and/or data connections to enable appropriate communications on the network. The data store may be used to store data, such as control plane information received from NEs, other CMs, etc. The data store may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store may incorporate electronic, magnetic, optical, and/or other types of storage media. The memory may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory may incorporate electronic, magnetic, optical, and/or other types of storage media. Note that the memory may have a distributed architecture, where various components are situated remotely from one another, but may be accessed by the processor.

Each of the CMs 200, 202 include a state machine 210, a link database (DB) 212, a topology DB 214, and a circuit DB 216. The CMs 200, 202 are responsible for all control plane processing. For example, the control plane may include OSRP, ASON, G-MPLS, or the like. The CMs 200, 202 may be configured in a redundant 1+1, 1:1, etc. configuration, or in an unprotected mode where there is a single CM such as the CM 200. The state machine 210 is configured to implement the behaviors described herein. The DBs 212, 214, 216 may be stored in the memory and/or data store. The link DB 212 includes updated information related to each link in a network. The topology DB 214 includes updated information related to the network topology, and the circuit DB 216 includes a listing of terminating circuits and transiting circuits at an NE where the CMs 200, 202 are located. The CMs 200, 202 may utilize control plane mechanisms to maintain the DBs 212, 214, 216. For example, a HELLO protocol can be used to discover and verify neighboring ports, nodes, protection bundles, and the like. Also, the DBs 212, 214, 216 may share topology state messages to exchange information to maintain identical data. Collectively, the state machine 210 and the DBs 212, 214, 216 may be utilized to advertise topology information, capacity availability, and provide connection management (provisioning and restoration). For example, each link in a network may have various attributes associated with it such as, for example, line protection, available capacity, total capacity, administrative weight, protection bundle identification, delay, and the like. The state machine 210 and the DBs 212, 214, 216 may be configured to provide automated end-to-end provisioning. For example, a route for a connection may be computed from originating node to terminating node and optimized using Dijkstra's Algorithm, i.e. shortest path from source to a destination based on the least administrative cost or weight, subject to a set of user-defined constraints.

Further, the CMs 200, 202 may be configured to perform overhead processing of OTN, SONET, SDH, etc. such as computation of performance management data, exchange of messages, and the like. The CMs 200, 202 are configured to communicate to other CMs 200, 202 in other nodes 102, 104 on the network 100. This communication may be either in-band or out-of-band. For SONET networks, the CMs 200, 202 may use standard or extended SONET line overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the present invention includes an in-band signaling mechanism utilizing OTN overhead. The General Communication Channels (GCC) defined by ITU-T Recommendation G.709 "Interfaces for the optical transport network (OTN)" G.709 are in-band side channel used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. In the present invention, GCC0, GCC1, GCC2 or GCC1+2 may be used for in-band signaling or routing to carry control plane traffic. Based on the intermediate equipment's termination layer, different bytes may be used to carry control plane traffic. If the ODU layer has faults, it has been ensured not to disrupt the GCC1 and GCC2 overhead bytes and thus achieving the proper delivery control plane packets.

Figure 3:
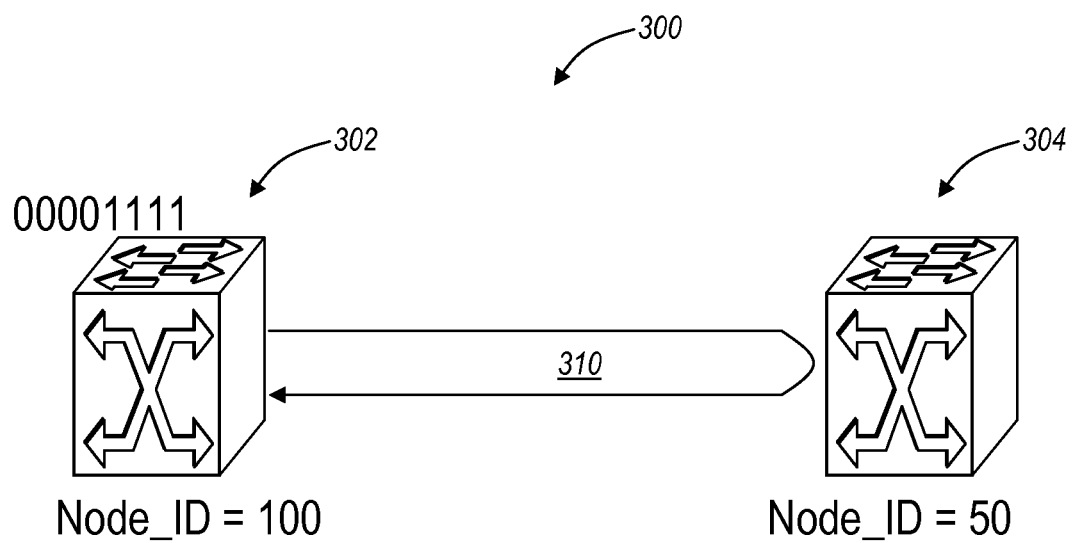
FIG. 3 is a diagram of an exemplary latency measurement between two nodes in a master-slave relationship in an optical network.

Referring to FIG. 3, in an exemplary embodiment, an exemplary latency measurement 300 is illustrated between two nodes 302, 304 in an optical network. Note, the two nodes 302, 304 may include either of the nodes 102, 104 in FIG. 1. In an exemplary embodiment, the present invention contemplates two methods of latency measurement including a master-slave measurement between nodes and an on-demand measurement between arbitrary points in the network. The exemplary latency measurement 300 illustrates an example of the master-slave measurement between the two nodes 302, 304. In the present invention, measurement of a line's latency between the two nodes 302, 304 can be triggered in one of two ways: manually by an operator and automatically at a predetermined interval (e.g., every fifteen minutes). Note, the latency measurements between the adjacent nodes 302, 304 may be included in PM data, e.g., the automated measurements at the predetermined time may be included in 15 min/24 hr PM bins. It is not expected that latency would change dramatically over these time periods, and the periodic measurements in the present invention allow for variations to be compensated.

The nodes 302, 304 are configured to operate OTN, SONET, or SDH, and are adjacent to one another from either a section or line perspective with respect to overhead. In OTN, G.709 includes the use of an overhead byte for a delay measurement between PM and TCM end points. Each line TCM provides the ability to perform a latency measurement within 50 μsec accuracy. Note, accuracy is dependent on the line rate and is bounded by the frame rate as the data must wait for the frame boundary before it can be looped back. Every link, such as a line 310 between the nodes 302, 304, is assigned a default value. When a link's latency can be measured, the measured value overwrites the default. When a link's latency cannot be measured, the user can manually enter a value for the links latency. Latency is measured by inserting a transition in a specified bit from a 0 to 1 or 1 to 0 at the node 302. This bit is looped back by the far end at the node 304. At the node 302, a count is kept of the number intervening frames it takes to receive the delay measurement signal back. In OTN, the exemplary latency measurement 300 is at TCM level 4.

The exemplary latency measurement 300 is a master-slave based measurement where in the example of FIG. 3 the node 302 is the master and the node 304 is the slave. Through the use of a signaling and routing protocol, the nodes 302, 304 may share a line exchange HELLO Message and discover each other's capabilities and automatically configure themselves to do latency measurements. For example, the nodes 302, 304 may learn whether the other is equipped with hardware and software to do latency measurements in HELLO exchanges, i.e., each advertises whether it is "latency measurement" capable. Note, the nodes 302, 304 may include the hardware and software in the CMs 200, 202 or the like to perform the latency measurements. In an exemplary embodiment, each of the nodes 302, 304 learns the other's identification (i.e., Node_ID), and the node 302 with the higher Node_ID assign itself to be the master, the other node 304 assigns itself to be a slave node, or vice versa. If both of the nodes 302, 304 are able to do latency measurements, the master node 302 automatically initiates latency measurements by writing to a register in a framer, and the framer will transition the bits from a 0 to 1 or 1 to 0. The slave node 304 automatically configures the framer on the line 310 to loop back the overhead bytes back to the master node 302. Once a measurement is initiated, the master node 302 counts the number of frames that transpire before a transitioned bit is returned from the framer at the end of the line 310, and the master node 302 converts the frame count to time and divides by two with this becoming the measured value for the latency of the line 310.

In an exemplary embodiment, the exemplary latency measurement 300 may be performed automatically through a network on every line 310 with corresponding nodes 302, 304 capable of performing such measurement to derive latency of the lines 310. This may be done at a predetermined interval, such as every fifteen minutes, or upon line state changes. In the case of aggregated links, a worst case value may be assigned at the link latency for the aggregated link. The measured value may also be advertised via the signaling and routing protocol to neighboring nodes and stored thereon. Here, the measured latency may be used to facilitate constraint-based routing for least latency and/or max latency path selection in the signaling and routing protocol. In the exemplary latency measurement 300, the link latency is based on a TCM level assigned on a per line 310 basis. This TCM level is automatically instantiated for each line 310 and is also used to isolate faults between switching nodes where intermediate Section Monitoring (SM) terminating DWDM equipment is present in OTN. The default TCM level is used for this purpose is TCM4.

Figure 4:
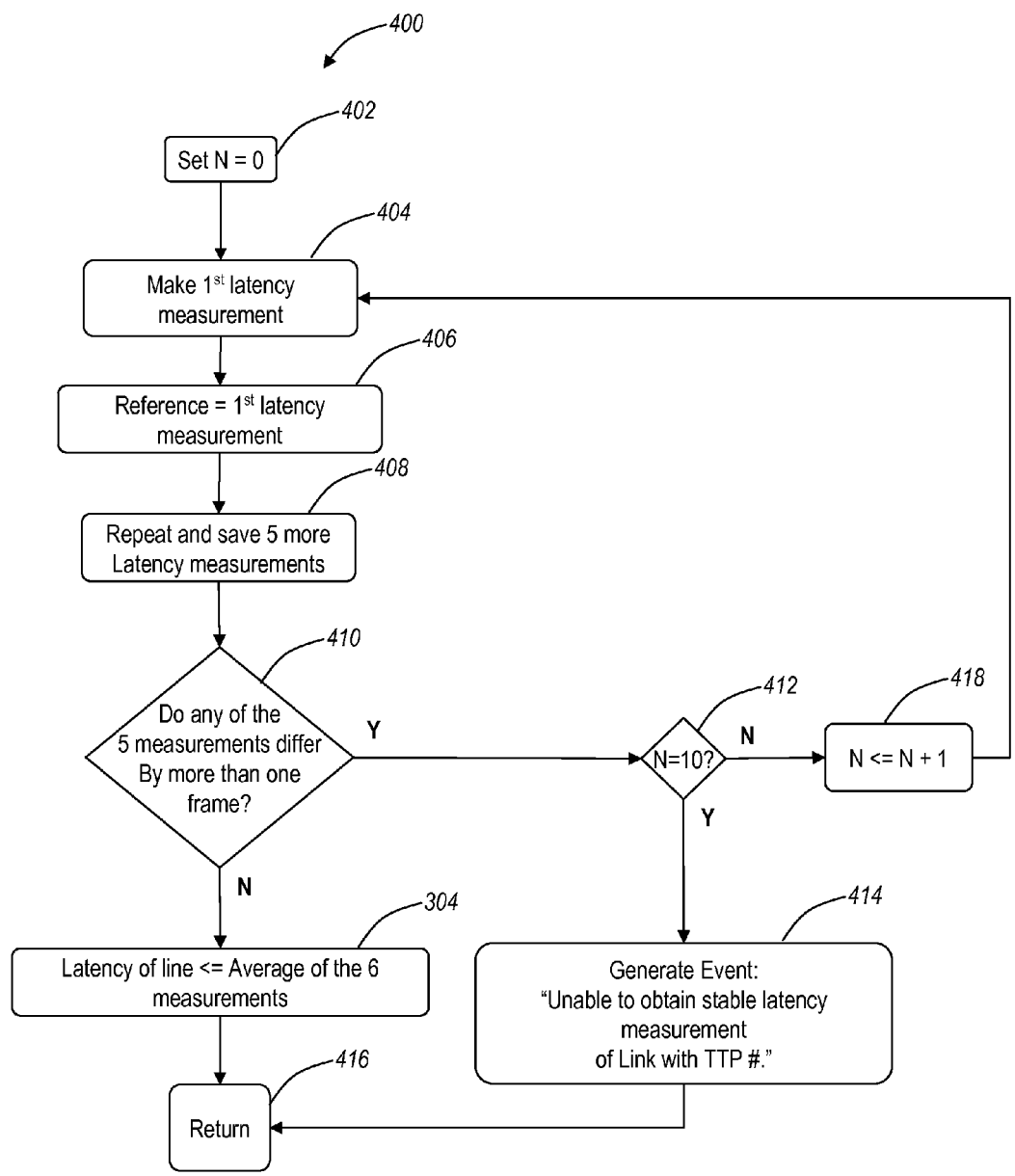
FIG. 4 is a flowchart illustrates a latency measurement method 400 utilizing a master-slave measurement between nodes.

Referring to FIG. 4, in an exemplary embodiment, a flowchart illustrates a latency measurement method 400 utilizing the exemplary latency measurement 300 and master-slave measurement between nodes. The latency method 400 may be implemented on the nodes 102, 104 in FIG. 1 and the nodes 302, 304 in FIG. 3 using the CMs 200, 202 in FIG. 2 or the like. The latency method 400 may further utilize OTN, SONET, SDH, or the like, and FIG. 4 is illustrated with respect to OTN as an example. First, a counter, N, is set at a master node (step 402). A first latency measurement is made between the master node and a slave node (step 404). As described herein, the latency measurement includes flagging one or more bits in overhead at the master node, transmitting to the slave node while concurrently implementing a counter, waiting for the slave node to loop back the flagged bits, and determining latency based on the counter divided by two when the flagged bits are received at the master node. This first latency measurement is set as a reference value (step 406). The latency measurement is repeated a plurality of times, such as five (step 408). These repeated measurements are taken to provide a trusted value, i.e. averaged value, and to ensure stability in the measurement.

The latency measurement method 400 checks to ensure that none of the measurements differ by more than one frame (step 410). If so, then the latency method 400 checks to see if the counter, N, is equal to some value, such as 10 (step 412). If so, this indicates the latency method 400 has tried several times, i.e. N times, and cannot get a stable measurement. Accordingly, an event is generated, e.g. "Unable to obtain stable latency measurement on Link with TTP #" (step 414). Note, TTP is a Trail Termination Point, and is used as an identifier of the particular line on which latency is being measured. The latency measurement method 400 then returns and exits (step 416). If N is not equal to the some value (step 412), the latency measurement method 400 increments the counter, N=N+1, (step 418) and returns to step 404. If none of the measurements differ by more than one frame (step 410), then the latency of the line is set to an averaged value of the plurality of measurements (step 420), and the latency measurement method 400 then returns and exits (step 416).

Figure 5:
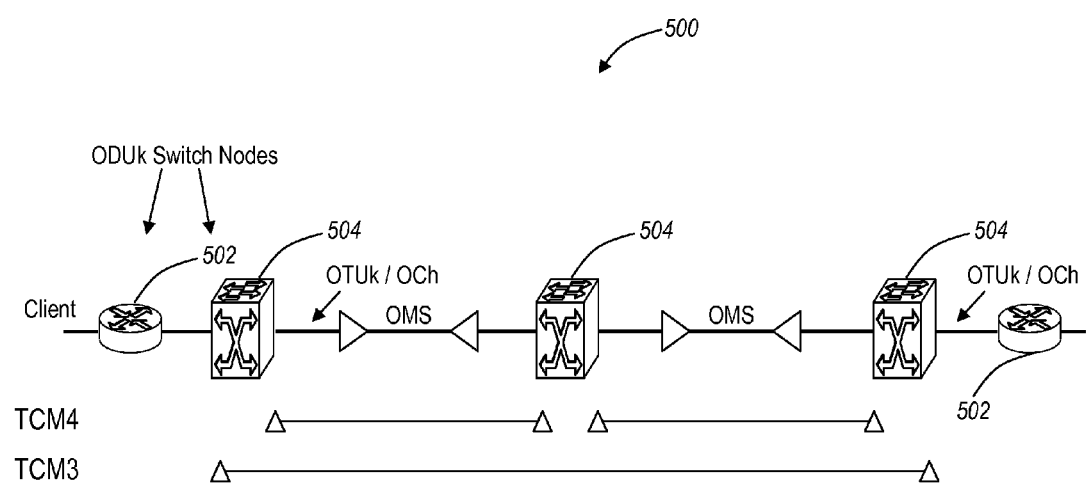
FIG. 5 is a diagram of a network showing the master-slave measurement between nodes and an on-demand measurement between arbitrary points in the network.

Referring to FIG. 5, in an exemplary embodiment, a network section 500 is illustrated showing the master-slave measurement between nodes and an on-demand measurement between arbitrary points in the network. Again, the network section 500 may further utilize OTN, SONET, SDH, or the like, and FIG. 5 is illustrated with respect to OTN as an example. The network section 500 illustrates two clients 502 interconnected through various optical switches 504. From an OTN perspective, between the client 502 and the optical switch 504, the line is an Optical Channel Data Unit-k (ODUk) and between the optical switches 504, the line is an Optical Channel Transmission Unit-k (OTUk). There further exists Optical Multiplex Sections (OMS) between the optical switches 504. Using Tandem Connection Monitoring (TCM), there are TCM4 connections between each of the optical switches 504 and TCM3 connections between the optical switches 504 connected to the clients 502. Using TCM level 4, a line's latency may be automatically measured between two nodes 504, as described between master and slave nodes. Again, this measured latency may be provided as a part of the 15 minute performance monitoring data. Using TCM level 3, latency may be measured between two arbitrary points in the network. This allows the user to perform an on-demand latency measurement. Note, as described herein, on-demand may refer to, but not limited to, periodic (timer based), user requested (manual), set up of a new line (as part of HELLO), and error recovery (on recovery from Signal Failure (SF) to OK—in this case the latency may change if there was a protection event in the transport layer beneath this protocol). Further, OTN includes six levels of TCM, and the present invention is described herein with reference to TCM3 and TCM4, and those of ordinary skill in the art will recognize that any of the six levels may be used herein. Further, latency may be measured in OTN using Path Monitoring (PM) overhead as well. Note, the present invention may configured to provide a new measurement based on a transition from OK to SF to OK (which could signal a change if latency if the optical transport beneath this layer had a protection event). Also, latency may be measured at the line level and at the link-level (for Link Aggregation). For Link Aggregation, the present invention may measure one of the aggregated lines and use this for the overall link, measure all lines in the aggregated link and average them, or select representative lines for the aggregated link.

Figure 6:
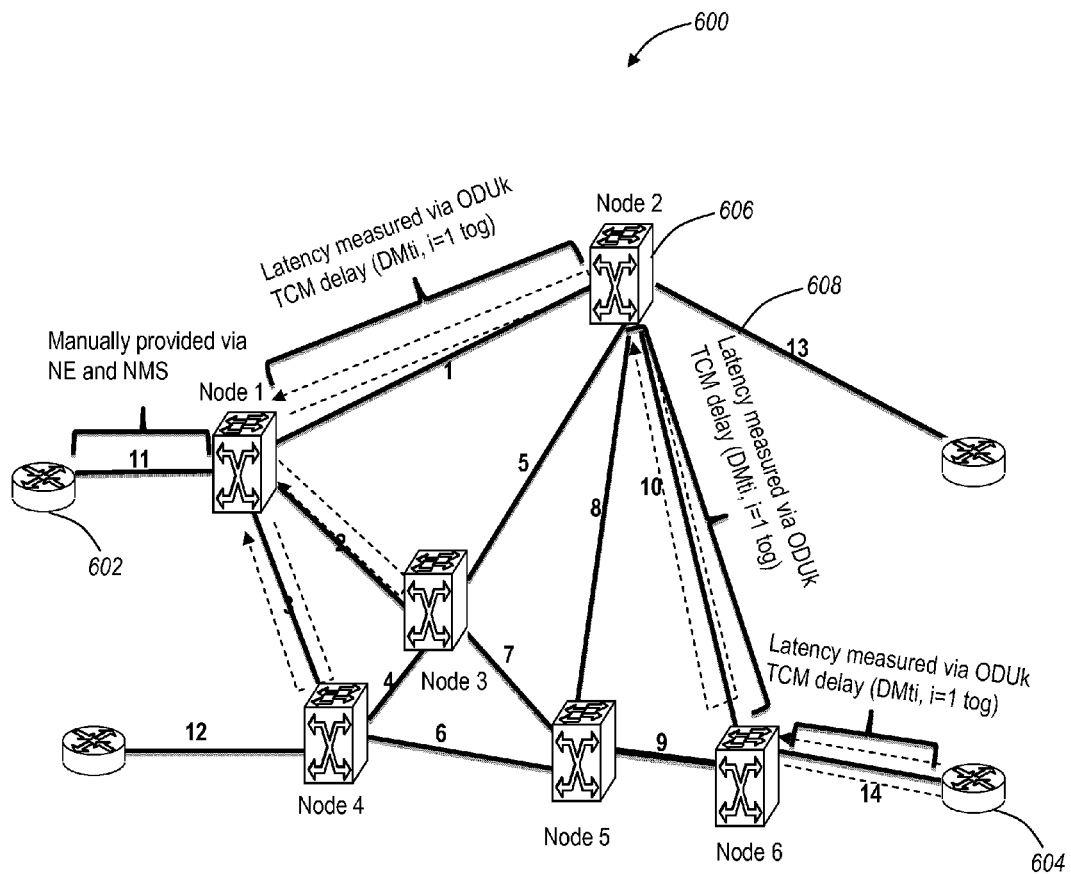
FIG. 6 is a network diagram of a network showing a latency measurement application using the master-slave measurement between nodes.

Referring to FIG. 6, in an exemplary embodiment, a network 600 illustrates a latency measurement application using the master-slave measurement between nodes described herein. Using TCM level 4, as described herein, node-to-node measurements are done, with only the master nodes at the end of the link making the measurements. The network 600 illustrates an example of using the master-slave measurement to calculate a link latency between clients 602, 604 across multiple links. The network 600 includes various optical switches 606 (labeled nodes 1-6) in an interconnected fashion via various links 608 (labeled links 1-14). The foregoing describes an example of calculating latency from the client 602 to the client 604 utilizing the master-slave measurement between nodes described herein. Assume node 1 is the node with highest Node_ID among nodes 1, 2, 3 and 4, all of which are connected to the node 1, then node 1 is designated the master and initiates the latency measurements. After measurements are made, node 1 distributes latency information among all nodes by way of routing messages using a signaling and routing protocol. For example, all of the optical switches 606 (nodes 1-6) may be included in an Internal-Network to Network Interface (I-NNI) domain associated with the signaling and routing protocol. Thus, all nodes in the domain will know the latency of the links between Nodes 1, 2, 3 and 4. Likewise, other master nodes may do the same as node 1. With all the latencies of the links 608 (labeled links 1-14) known, latency of any path between the clients 602, 604 may be easily computed. For example, assume a path using links 1 and 10, then the latency equals: End-to-End circuit latency=Delay of Link 1+Node 2 Delay+Delay of Link 10. Note, in addition to latency caused by the links 608, there is also latency caused within the optical switches 606. In the present invention, this latency may be treated as a constant for a particular type of network element. For example, based on previous measurements, a typical optical switch may impose a latency of 15 µs. This value may be predetermined and incorporated as a constant in the calculation.

Figure 7:
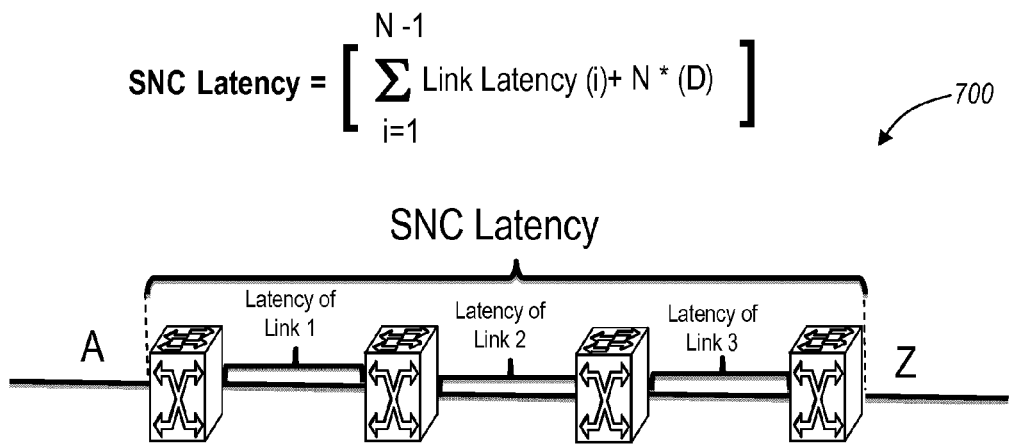
FIG. 7 is a network diagram of an exemplary calculation using the master-slave measurement between nodes.

Referring to FIG. 7, in an exemplary embodiment, a network 700 illustrates an exemplary calculation using the master-slave measurement between nodes described herein. Using the master-slave measurement, the exemplary latency measurement 300, the latency measurement method 400, etc., a link latency for a SNC (or for any other type of network connection spanning multiple links and nodes) may be calculated as follows:

$$\text{Latency} = \left[ \sum_{N}^{N-1} \text{LinkLatency}(i) + N \times D \right]$$

Where N equals a number of nodes, LinkLatency(i) is the measured link latency on a link i, and D is a constant representing a delay value through a node. The network 700 illustrates an exemplary calculation from point A to point Z through four (N=4) optical nodes. For example, assume the link latencies for links 1, 2, 3 are 1 ms, 4 ms, and 2.5 ms respectively, then the overall link latency from point A to point Z is 1 ms+4 ms+2.5 ms+4×(15 µsec)=7.56 ms.

Figure 8:
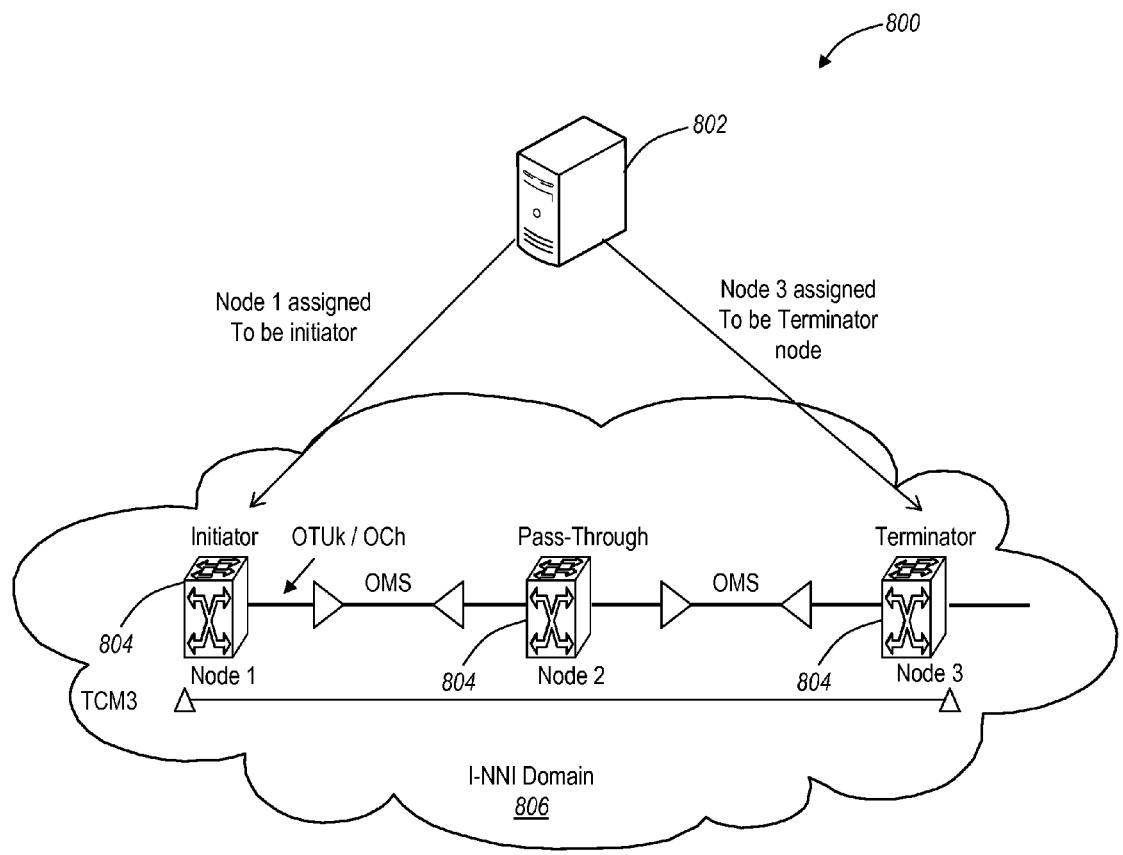
FIG. 8 is a network diagram of an on-demand latency measurement between arbitrary points in the network using a management system.

Referring to FIG. 8, in an exemplary embodiment, a network 800 illustrates an on-demand latency measurement between arbitrary points in the network using a management system 802. The management system 802 is communicatively coupled to a plurality of nodes 804 within an I-NNI domain 806. The management system 802 may include a network management system (NMS), element management system (EMS), operations support system (OSS), craft interface (CI), and the like. Generally, the management system 802 is a computer system with a network connection to one or more of the nodes 804. The network connection to the one or more nodes 804 provides the ability for the management system 802 to communicate with all of the nodes 804, such as through an optical service channel, overhead bytes, etc. The management system 802 may include a graphical user interface (GUI) for ease of use, and may further utilize any of Transaction Language-1 (TL-1), Simple Network Management Protocol (SNMP), Common Object Request Broker Architecture (CORBA), and the like. In terms of software, the management system 802 may include various programs for providing OAM&P functionality at both a node level and at a network level. In an exemplary embodiment of the present invention, the management system 802 includes an on-demand latency measurement program that allows a user to select any starting point node and ending point node in the domain 806 along with all nodes/links in a path between the two endpoints for a latency measurement of that path. The management system 802 is configured to instruct the associated nodes 802 to perform latency measurements and to return these values to the management system 802 for determining the latency measurement of that path.

In an exemplary embodiment, the on-demand latency measurement is performed by defining three different types of nodes 804 in the network. The on-demand latency measurement utilizes TCM level 3 which allows for on-demand latency measurements between any two points in the domain 805. In particular, the management system 802 may define an initiator node, one or more pass through nodes, and a terminator node. The initiator node is similar to the master node described herein, and in the example of FIG. 8, node 1 is assigned by the management system 802 to be the initiator node. When a latency measurement is demanded, node 1 transitions the overhead bits from a 0 to 1 or 1 to 0 initiating a latency measurement. By default, all other nodes 804 in the network are pass-through nodes where nothing is done with respect to the on-demand latency measurement other than passing signals including the transitioned overhead bits through. The terminator node is similar to the slave node described herein where the terminator node is configured to loop back the transitioned overhead bytes. The terminator node is defined by the management system 802, and in the example of FIG. 8, node 3 is assigned to be the terminator node. The nodes 804 are configured to return latency measurements per path to the management system 802, and the management system 802 may compute the end-to-end latency using the equation described herein in FIG. 7.

Figure 9:
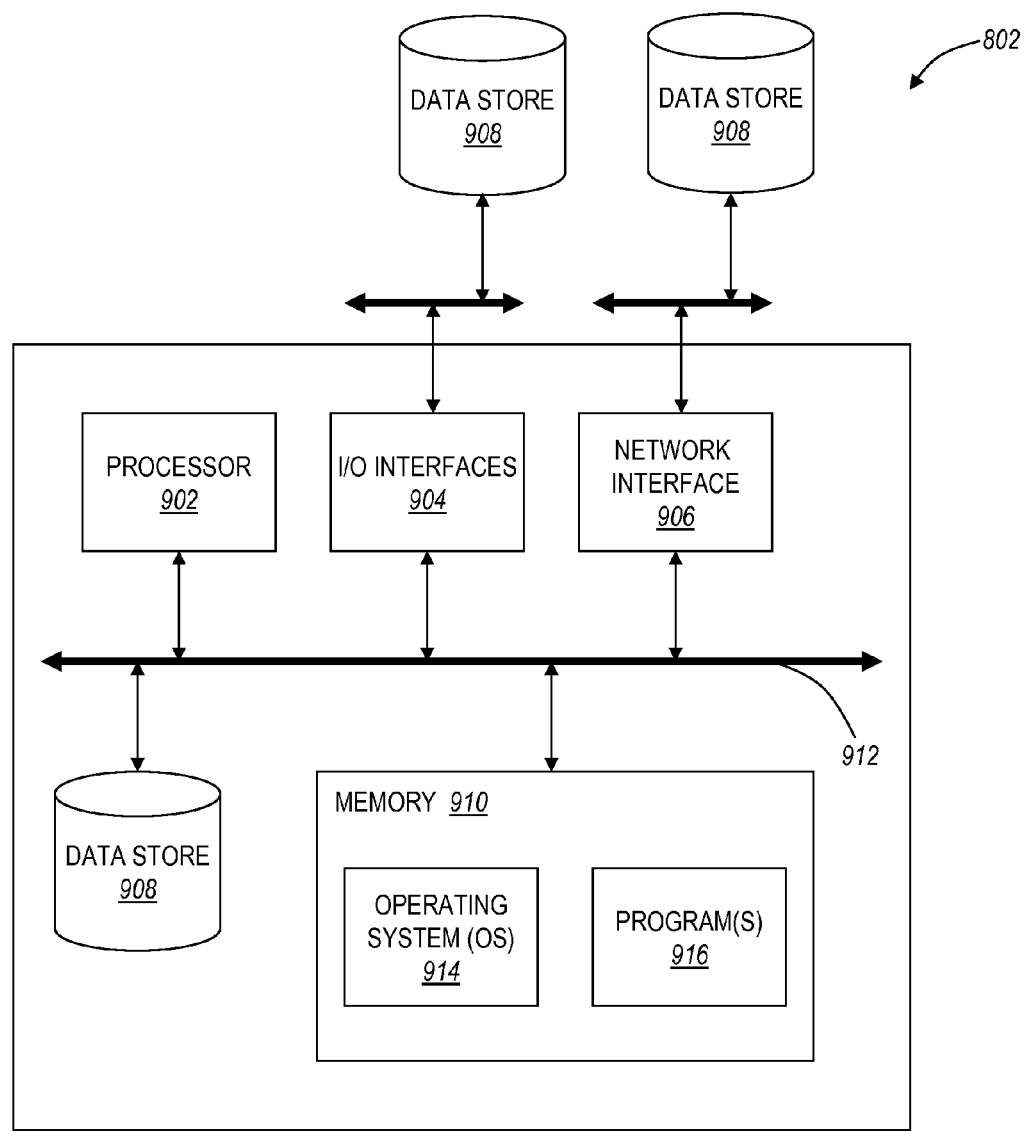
FIG. 9 is a block diagram of a management system which may be utilized for the on-demand latency measurement.

Referring to FIG. 9, in an exemplary embodiment, a block diagram illustrates a management system 802 which may be utilized for the on-demand latency measurement. The management system 802 may be a digital computer that, in terms of hardware architecture, generally includes a processor 902, input/output (I/O) interfaces 904, a network interface 906, a data store 908, and a memory 910. The components (902, 904, 906, 908, and 910) are communicatively coupled via a local interface 912. The local interface 912 may be, for example but not limited to, one or more buses or other wired or wireless connections, as is known in the art. The local interface 912 may have additional elements, which are omitted for simplicity, such as controllers, buffers (caches), drivers, repeaters, and receivers, among many others, to enable communications. Further, the local interface 912 may include address, control, and/or data connections to enable appropriate communications among the aforementioned components. The processor 902 is a hardware device for executing software instructions. The processor 902 may be any custom made or commercially available processor, a central processing unit (CPU), an auxiliary processor among several processors associated with the management system 802, a semiconductor-based microprocessor (in the form of a microchip or chip set), or generally any device for executing software instructions. When the management system 802 is in operation, the processor 902 is configured to execute software stored within the memory 910, to communicate data to and from the memory 910, and to generally control operations of the management system 802 pursuant to the software instructions.

The I/O interfaces 904 may be used to receive user input from and/or for providing system output to one or more devices or components. User input may be provided via, for example, a keyboard, touch pad, and/or a mouse. System output may be provided via a display device and a printer (not shown). I/O interfaces 904 can include, for example, a serial port, a parallel port, a small computer system interface (SCSI), an infrared (IR) interface, a radio frequency (RF) interface, and/or a universal serial bus (USB) interface. The I/O interfaces 904 may further include a graphical user interface (GUI) for a user to interact with the management system 802 including performing the on-demand latency measurements. The network interface 906 may be used to enable the management system 802 to communicate on a network, such as the Internet, a data communication network (DCN), etc. For example, the management system 802 can utilize the network interface 906 to communicate to/from network elements, nodes, optical switches, etc. The network interface 906 may include, for example, an Ethernet card or adapter (e.g., 10 BaseT, Fast Ethernet, Gigabit Ethernet) or a wireless local area network (WLAN) card or adapter (e.g., 802.11a/b/g/n). The network interface 906 may include address, control, and/or data connections to enable appropriate communications on the network. A data store 908 may be used to store data associated with the management system 802. The data store 908 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 908 may incorporate electronic, magnetic, optical, and/or other types of storage media. In one example, the data store 908 may be located internal to the management system 802 such as, for example, an internal hard drive connected to the local interface 912 in the management system 802. Additionally in another embodiment, the data store 908 may be located external to the management system 802 such as, for example, an external hard drive connected to the I/O interfaces 904 (e.g., SCSI or USB connection). In a further embodiment, the data store 908 may be connected to the management system 802 through a network, such as, for example, a network attached file server.

The memory 910 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 910 may incorporate electronic, magnetic, optical, and/or other types of storage media. Note that the memory 910 may have a distributed architecture, where various components are situated remotely from one another, but can be accessed by the processor 902. The software in memory 910 may include one or more software programs, each of which includes an ordered listing of executable instructions for implementing logical functions. The software in the memory 910 includes a suitable operating system (O/S) 914 and one or more programs 916. The operating system 914 essentially controls the execution of other computer programs, such as the one or more programs 916, and provides scheduling, input-output control, file and data management, memory management, and communication control and related services. The operating system 914 may be any of Windows NT, Windows 2000, Windows XP, Windows Vista, Windows 7, Windows Server 2003/2008 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), or the like. The one or more programs 916 may be configured to implement the various processes, algorithms, methods, techniques, etc. for performing network and element management functions. In an exemplary embodiment, the one or more programs 916 include a program for providing on-demand latency measurements. This program may include code configured to perform the various processes, methods, techniques, etc. described herein for performing latency measurements.

Figure 10:
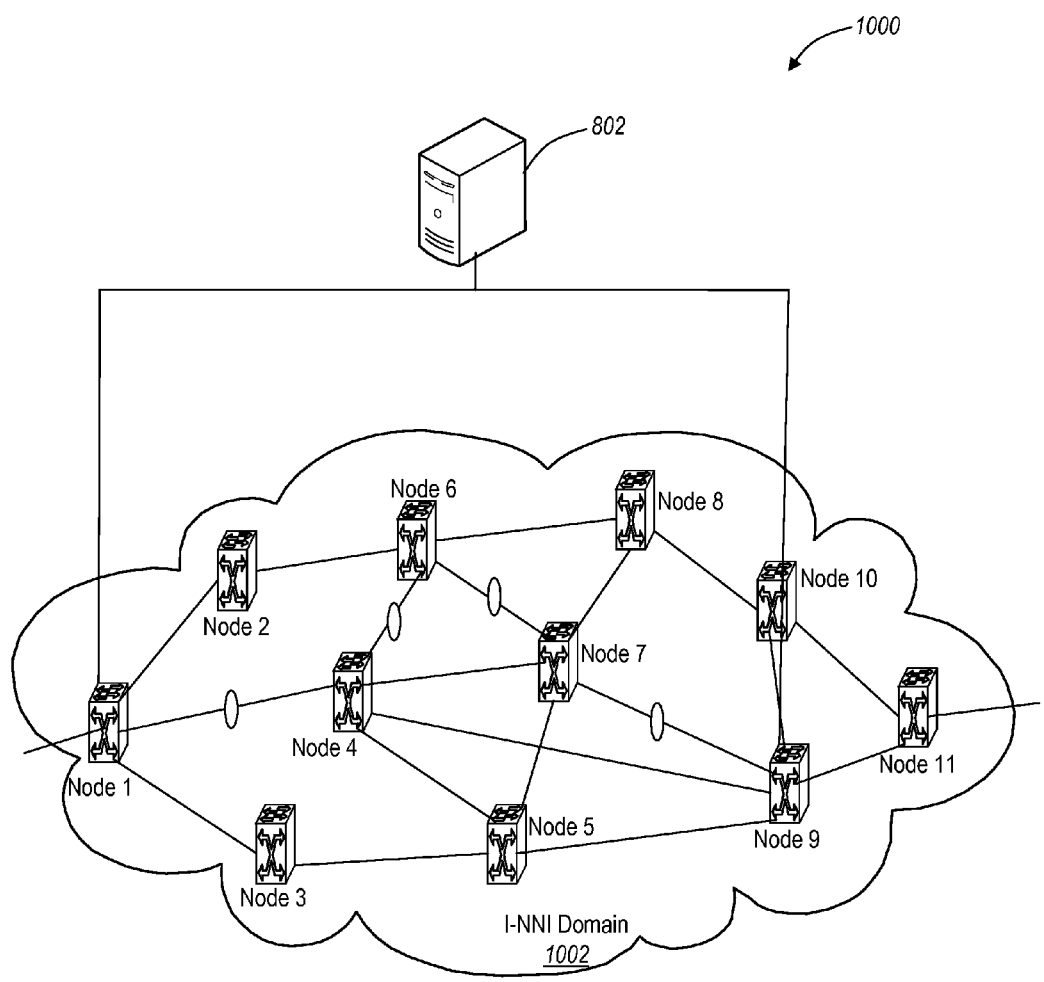
FIG. 10 is a network diagram of an on-demand ODUk TCM latency measurement between two arbitrary points in an I-NNI domain.

Referring to FIG. 10, in an exemplary embodiment, a network 1000 illustrates an on-demand ODUk TCM latency measurement between two arbitrary points in an I-NNI domain 1002. The network 1000 includes a plurality of nodes (labeled nodes 1-11) in the I-NNI domain 1002 and communicatively coupled to a management system 802. A user is operating the management system 802 and the user points and clicks nodes and links from a starting to an ending node. In this example, the path is node 1 to node 4 to node 6 to node 7 to node 9. The user may or may not be able to select a specific line within a link. In this exemplary embodiment, the originating and terminating points are only nodes, in this example they are nodes 1 and 9 respectively. Upon the user inputting this data to the management system 802, the management system 802 issues commands including a command to node 1 assigning it to be a master in an On-demand measurement; a command to node 9 assigning it to be a terminating node; and a command to node 1 specifying a designated transit list (DTL) of a path for which latency is desired, in this case the DTL specifies the path node 1 to node 4 to node 6 to node 7 to node 9. Then, the nodes 1 and 9 execute the on-demand latency algorithm described herein and return a latency value to the management system 802 for the DTL requested.

Figure 11:
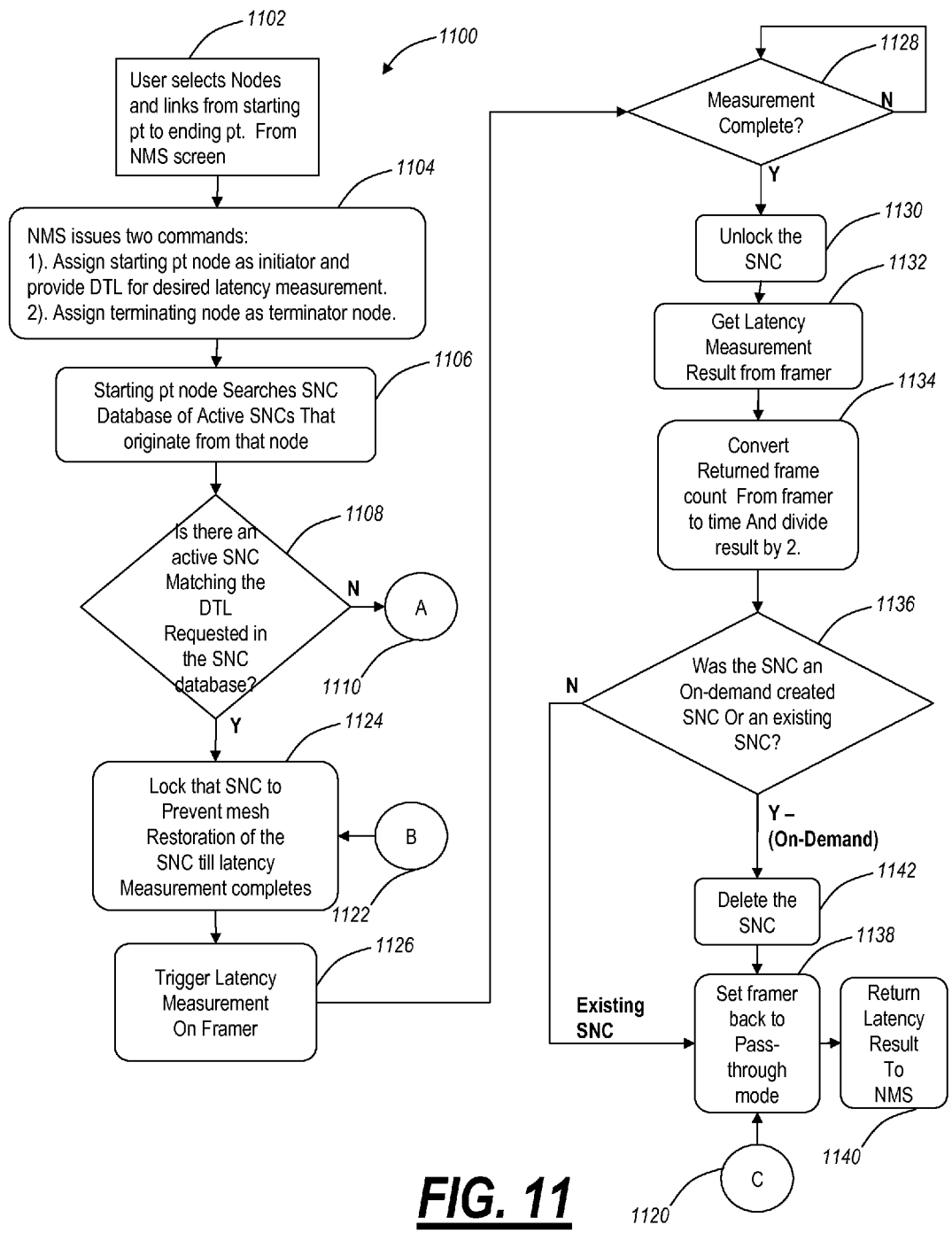
FIGS. 11 and 12 are flowcharts of an on-demand latency measurement method for latency measurement between two arbitrary points.
Figure 12:
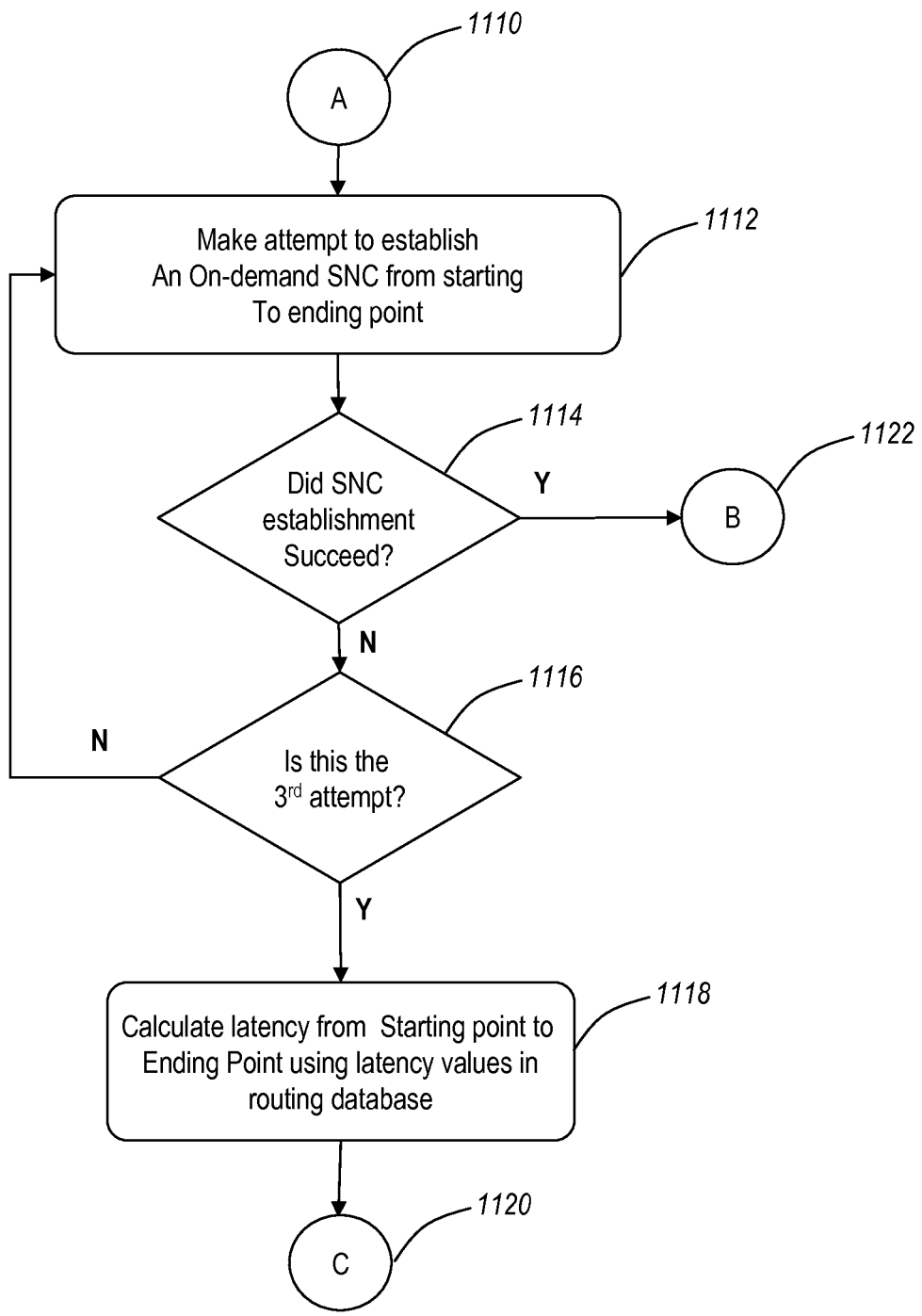

Referring to FIGS. 11-12, in an exemplary embodiment, a flowchart illustrates an on-demand latency measurement method 1100 for latency measurement between two arbitrary points. The on-demand latency measurement 1100 may utilize the management system 802 as described herein. First, a user selects nodes and links from a starting point to an ending point from an NMS screen (e.g., through the management system 802) (step 1102). The NMS issues two commands to nodes including 1) assigning a starting point node as the initiator node and providing a DTL for the desired latency measurement, and 2) assigning a terminating node as the terminator node (step 1104). The starting point node searches its SNC database of active SNCs that originate from that node (step 1106). This may be performed using the CMs 200, 202 associated with the starting point node. The method 1100 checks if there is an active SNC matching the DTL requested in the SNC database (step 1108). If not, the method 1100 goes to step A 1110 in FIG. 12. The starting point node makes an attempt to establish an on-demand SNC from the starting point to the ending point using the DTL (step 1120). The method 1100 then checks if the SNC is successful established (step 1114). If not, the method 1100 checks if this is the third (or any arbitrary value) attempt (step 1116). If so, the method 1100 is not able to measure the latency via a measurement and instead calculates the latency from the starting point to the ending point using latency values stored in a routing database (step 1118) and returns to step C 1120 in FIG. 11. If the SNC is successfully established (step 1114), the method returns to step B 1122 in FIG. 11.

Once there is an active SNC matching the DTL (steps 1108, 1122), the SNC is locked to prevent mesh restoration or the like of the SNC until the latency measurement is completed (step 1124). The latency measurement is then triggered on a framer for the particular SNC (step 1126). The method 1100 then waits for the measurement to complete (step 1128).

Upon completion, the SNC is unlocked (step 1130), and the latency measurement result is retrieved from the framer (step 1132). The result is converted to time by and divided by two (step 1134). The method 1100 then checks if the SNC was created for the measurement or an existing SNC (step 1136). If the SNC was existing, the method 1100 sets the framer back to pass-through mode (step 1138) and returns the latency result to the NMS (step 1140). If the SNC was created, the method 1100 deletes the SNC (step 1142) and proceeds to step 1138.

Figure 13:
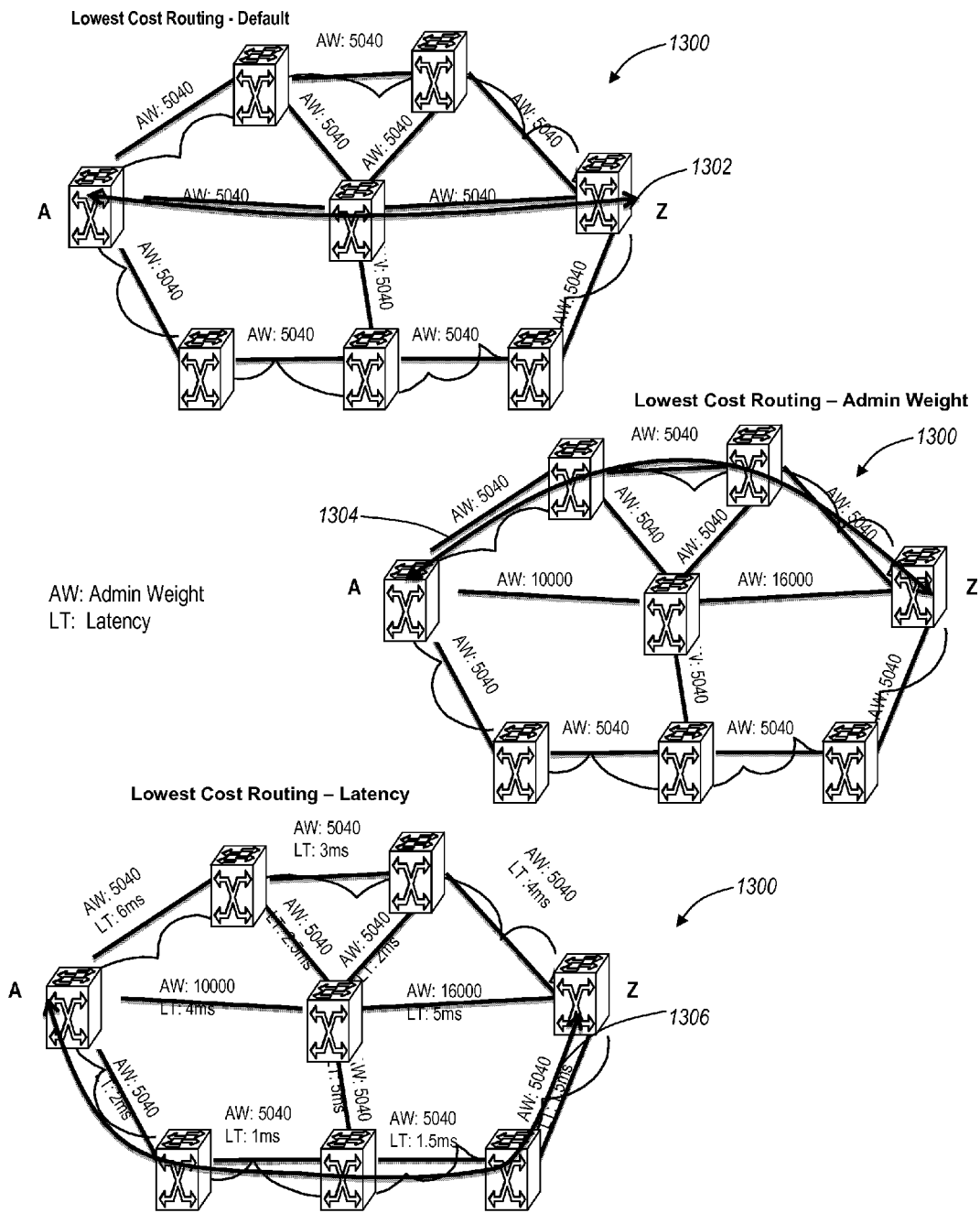
FIG. 13 is a network diagram showing routing of SNCs based on different constraints.

Referring to FIG. 13, in an exemplary embodiment, a network 1300 is illustrated showing routing of SNCs 1302, 1304, 1306 based on different constraints. In general, routing and signaling protocols utilize a plurality of criteria to determine a link cost when deciding how to route a particular SNC. Examples of the criteria may include line protection type, available capacity, total capacity, protection ID bundle, distance, user-defined constraints, and the like. These criteria may be bundled to form a link weight or an administrative weight. In an exemplary embodiment, the present invention may consider measured latency values in conjunction with routing circuits. Specifically, the measured latency values may be included as part of the criteria and in the administrative weight or they may be considered separately in addition to administrative weight. The network 1300 is illustrated in FIG. 13 using three different considerations in routing an SNC. First, an SNC 1302 is routed using lowest cost routing in a situation where admin weights are set to a default value or where all of the admin weights are equal. An SNC 1304 is routed where the admin weights of the two center links have been adjusted. Finally, an SNC 1306 is routed where auto-latency calculation is enabled in the network (or applied manually) and the routing criteria is set to the lowest total latency. Note, the SNCs 1302, 1304 are routed based on the lowest total admin weight summing the weights per link whereas the SNC 1306 is routed based on the lowest total latency.

Furthermore, SNCs may be routed in the network 1300 by specifying a maximum amount of latency, e.g. through the management system 802. For example, assume an SNC is desired between points A and Z with a maximum latency of 5ms. The present invention, through the nodes, CMs 200, 202, management system 802, etc., can determine that there are nine possible routes between points A and Z. Further, with the systems and methods described herein, the present invention may calculate the latency for each link. This may include the following: Route 1: 2+1+1.5+2=6.5 ms; Route 2: 4+5=9 ms; Route 3: 4+5+1.5+2=12.5 ms; Route 4: 2+1+5+5=13 ms; Route 5: 6+3+4=13 ms; Route 6: 6+2.5+5=13.5 ms; Route 7: 6+2.5+2+4=14.5 ms; Route 8: 6+3+2+5=16 ms; and Route 9: 6+2.5+5+1.5+2=17 ms. Here, the present invention would determine no route is less than 5 ms, and either select the 6.5 ms route or provide an error message. Advantageously, the present invention may provide an ability to assign a maximum latency to each individual circuit. In an exemplary embodiment, the network 1300 is configured to select Max Latency and Max Admin Weight behavior as mutually exclusive criteria, i.e. each circuit selects either Admin Weight or Latency as routing preference and if no latency exists for a link then a provisionable latency value may be utilized.

Figure 14:
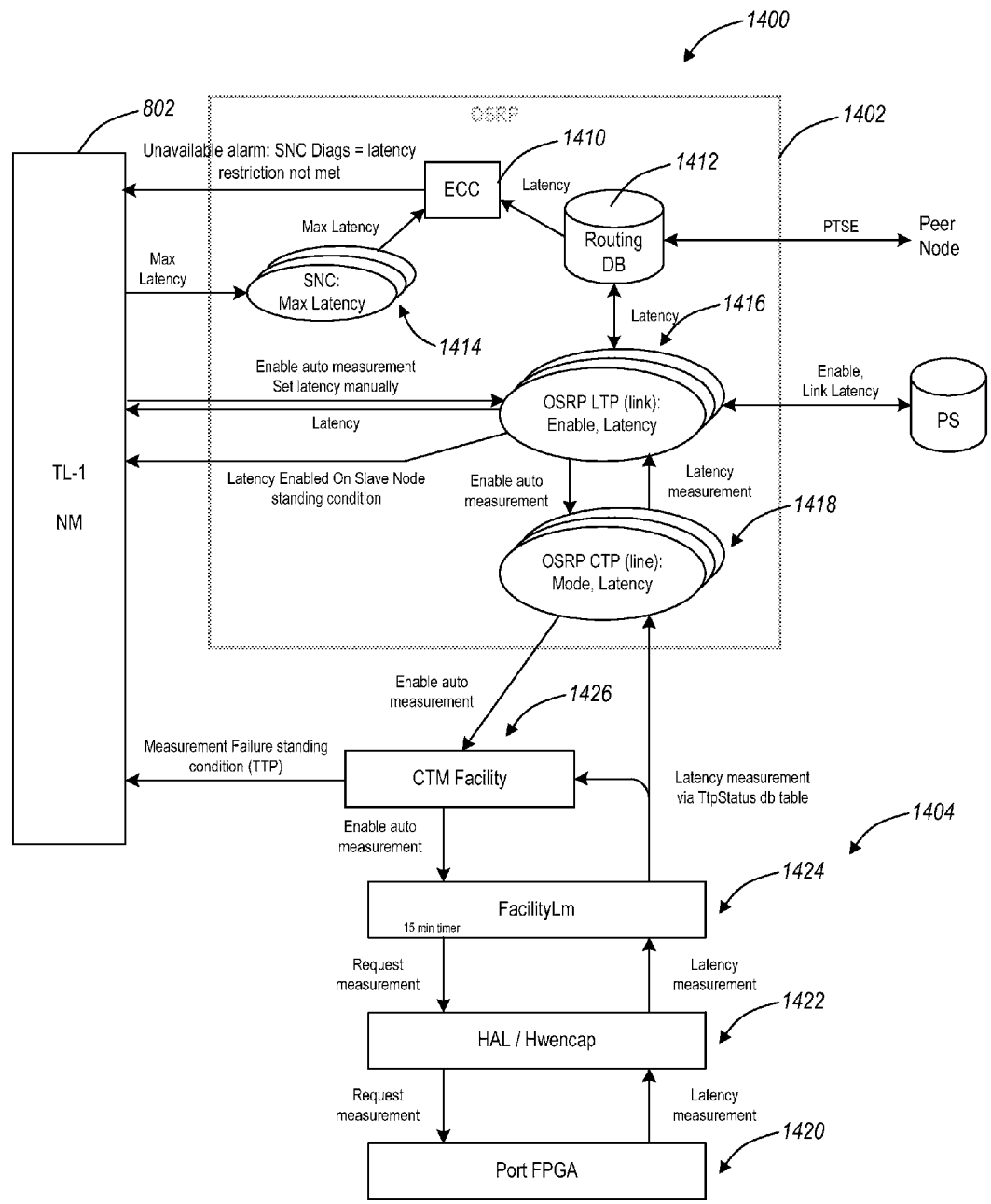
FIG. 14 is a diagram of a latency routing software architecture that may exist between a management system, nodes, and a signaling and routing protocol.

Referring to FIG. 14, in an exemplary embodiment, a diagram illustrates a latency routing software architecture 1400 that may exist between the management system 802, nodes, and a signaling and routing protocol. In general, the latency routing software architecture 1400 includes three components including the management system 802, a signaling and routing protocol 1402 (e.g., OSRP in this example), and hardware, firmware, and software components 1404. The management system 802 generally interfaces with the signaling and routing protocol 1402, and the signaling and routing protocol 1402 generally interfaces with the components 1404. The signaling and routing protocol 1402 may operate within the CMs 200, 202 in FIG. 2, and generally includes an edge call control (ECC) 1410 module and a routing database 1412. The signaling and routing protocol 1402 may include values 1414 for maximum latency of particular SNCs, values 1416 for OSRP Link Termination Point (LTP) enabled and latency values, and values 1418 for OSRP Connection Termination Point (CTP) mode and latency values. The values 141 may be set through the management system 802 and provided to the ECC 1410 for path determination. The ECC 1410 may provide an alarm to the management system 802 if it is not possible to find a path with the set maximum latency. The ECC 1410 may compute paths based on input from the routing database 1412. The routing database 1412 may received the values 1416, 1418 from the components 1404. The hardware, firmware, and software components 1404 include physical hardware referred to as a port field programmable gate array (FPGA) 1420 that interfaces a hardware abstraction layer (HAL) 1422. The port FPGA 1420 may provide the physical measurement of the latency by actually transmitting and receiving data. The HAL 1422 is a hardware encapsulation layer that interfaces higher levels of software including facility line module software 1424 and core transport manager (CTM) software 1426.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. An optical network, comprising:
   a plurality of optical nodes;
   a plurality of links interconnecting the plurality of optical nodes; and
   wherein a first node of the plurality of optical nodes is configured to initiate a latency measurement to a second node of the plurality of optical nodes via transmitting an indicator using a signaling and routing protocol, the second node configured to receive and loop-back the indicator to the first node, and the first node configured to calculate latency to the second node based upon reception of the loop-backed indicator; and
   wherein the first node is configured to calculate latency by adding latencies associated with each of the plurality of links between the first node and the second node plus a predetermined latency time for each pass-through node.

2. The optical network of claim 1, wherein the indicator comprises transitioning one or more bits in overhead.

3. The optical network of claim 2, wherein the overhead comprises Synchronous Optical Network or Synchronous Digital Hierarchy.

4. The optical network of claim 2, wherein the overhead comprises Optical Transport Network.

5. The optical network of claim 1, wherein the first node is configured to perform a plurality of latency measurements to the second node and computing an average of the plurality of latency measurements.

6. The optical network of claim 5, wherein, if the plurality of latency measurements differs by more than one frame, then the first node indicates inability to obtain a stable latency measurement.

7. The optical network of claim 1, further comprising:
a management system communicatively coupled to the plurality of nodes;
wherein the management system is configured to execute an on-demand latency measurement between any arbitrary points of the plurality of nodes with the first node and the second node selected through the management system.

8. The optical network of claim 7, wherein the on-demand latency measurement comprises:
determining a designated transit list between the first node and the second node; and
utilizing an active sub network connection on the designated transit list for the indicator to measure latency at the first node.

9. The optical network of claim 8, wherein the on-demand latency measurement further comprises:
if there is no active sub network connection on the designated transit list, creating an on-demand sub network connection to measure latency at the first node; and
deleting the on-demand sub network connection following measurement.

10. The optical network of claim 1, further comprising:
a controller disposed at the first node and the second node, wherein the controller is configured to operate a signaling and routing protocol to provision sub network connections between the first node and the second node;
wherein the controller is configured to transmit and receive measured or manually entered latencies associated with the plurality of links via messages in the signaling and routing protocol; and
wherein the controller is configured to utilized the latencies in route selection of the sub network connections.

11. The optical network of claim 10, wherein the controller is configured to route the sub network connections between the first node and the second node to ensure that the total latency from the first node to the second node is less than the maximum latency specified for the sub network connection.

12. A method, comprising:
operating an optical network comprising a plurality of nodes and a signaling and routing protocol;
utilizing a latency measurement algorithm to measure latency on a plurality of links interconnecting the plurality of nodes using the signaling and routing protocol;
distributing measured latency values on the plurality of links via messages in the signaling and routing protocol;
storing the measured latency values in a database;
utilizing the measured latency values in the signaling and routing protocol for route selection;
requesting a sub network connection between two nodes of the plurality of nodes;
requesting a maximum latency value for the sub network connection; and
determining a designated transit list based on the maximum latency value and the measured latency values.

13. The method of claim 12, wherein the latency measurement algorithm comprises:
determining a master node and a slave node of the plurality of nodes, wherein the master node and the slave node are adjacent to one another connected by a link of the plurality of links;
transmitting an indicator from the master node to the slave node;
looping back the indicator at the slave node to the master node;
receiving the looped back indicator at the master node and computing a latency value; and
repeating the transmitting, looping back, and receiving steps a plurality of times to provide an averaged latency measurement as the measured latency value of the link.

14. The method of claim 13, wherein master node and the slave node are determined based upon node identification values.

15. A latency measurement method, comprising:
operating a plurality of optical nodes in a domain, wherein the plurality of optical nodes are communicatively coupled to a management system;
selecting two arbitrary nodes defined as an initiator node and a terminator node of the plurality of optical nodes for computing latency therebetween using a signaling and routing protocol;
selecting a designated transit list between the two arbitrary nodes;
transmitting an indicator in an active sub network connection using the designated transit list to the terminator node from the initiator node;
looping back the indicator at the terminator node to the initiator node; and
receiving the indicator at the indicator node and computing latency based upon a time interval from transmitting the indicator until the receiving the indicator divided by two.

16. The latency measurement method of claim 15, further comprising:
if no active sub network connection exists using the designated transit list, creating an on-demand sub network connection using the designated transit list thereby providing the active sub network connection; and
deleting the on-demand sub network connection upon completion.

17. The latency measurement method of claim 15, further comprising:
locking the active sub network connection prior to the transmitting step thereby preventing mesh restoration; and
unlocking the active sub network connection upon completion.

* * * * *